(12) United States Patent
Patterson et al.

(10) Patent No.: US 7,385,520 B2
(45) Date of Patent: Jun. 10, 2008

(54) CHILD RESTRAINT SYSTEM COMPRISING WEIGHT SENSOR

(75) Inventors: James F. Patterson, Greentown, IN (US); Stuart S. Sullivan, Peru, IN (US); Duane D. Fortune, Lebanon, IN (US); William W. Fultz, Carmel, IN (US); Kevin D. Kincaid, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 243 days.

(21) Appl. No.: 11/146,921

(22) Filed: Jun. 6, 2005

(65) Prior Publication Data

US 2005/0275554 A1  Dec. 15, 2005

Related U.S. Application Data

(60) Provisional application No. 60/607,988, filed on Sep. 8, 2004, provisional application No. 60/577,546, filed on Jun. 7, 2004.

(51) Int. Cl.
*G08B 21/00* (2006.01)
*B60K 28/00* (2006.01)
*B60R 21/16* (2006.01)
*H01H 35/00* (2006.01)

(52) U.S. Cl. .................. 340/667; 340/665; 340/666; 340/668; 180/273; 280/735; 200/85 A

(58) Field of Classification Search .................. None
See application file for complete search history.

(56) References Cited

U.S. PATENT DOCUMENTS

| 4,039,224 A | 8/1977 | Bauer et al. |
| 5,174,035 A | 12/1992 | Yamazaki |
| 5,260,684 A * | 11/1993 | Metzmaker ............... 340/457.1 |
| 5,454,591 A * | 10/1995 | Mazur et al. ............... 280/735 |
| 5,581,234 A | 12/1996 | Emery et al. |

(Continued)

FOREIGN PATENT DOCUMENTS

GB     2290505      1/1996

(Continued)

OTHER PUBLICATIONS

Micronas, Mar. 2003, HAL 18xx, Low-Cost Programmable Linear Hall-Effect Sensor (2 pages).

(Continued)

*Primary Examiner*—Julie Lieu
(74) *Attorney, Agent, or Firm*—Doug D. Fekete

(57) ABSTRACT

A child restraint system for transporting a child within an automotive vehicle includes a weight sensor for determining the weight of the child and compares the child's weight to a recommended weight range. The weight sensor is disposed within a cushion that lines a shell and provides an electrical signal to a control unit. The control unit processes the electrical signal and provides an alert signal when the weight is not within the recommended range. Also, the child restraint system may include a second sensor for sensing a condition that depends upon the child's weight such as directional orientation or angular orientation of the child restraint system, or location or tension of a vehicle seat belt or tether that secures the child restraint system within the vehicle, or the location or tension of a harness for restraining the child occupant within the child restraint system.

24 Claims, 3 Drawing Sheets

U.S. PATENT DOCUMENTS

| | | | |
|---|---|---|---|
| 5,656,994 A | 8/1997 | Heninger | 340/457.1 |
| 5,711,574 A | 1/1998 | Barnes | 297/216.11 |
| 5,720,519 A | 2/1998 | Barnes | 297/216.11 |
| 5,758,737 A | 6/1998 | Brown et al. | |
| 5,833,311 A | 11/1998 | Friedrich et al. | |
| 5,965,827 A | 10/1999 | Stanley et al. | |
| 5,984,349 A | 11/1999 | Van Voorhies | |
| 6,037,860 A | 3/2000 | Zander et al. | |
| 6,151,540 A | 11/2000 | Anishetty | 701/45 |
| 6,203,059 B1 | 3/2001 | Mazur et al. | |
| 6,246,936 B1 | 6/2001 | Murphy et al. | 701/45 |
| 6,255,790 B1 | 7/2001 | Popp et al. | |
| 6,259,042 B1 | 7/2001 | David | |
| 6,264,236 B1 | 7/2001 | Aoki | |
| 6,272,936 B1 | 8/2001 | Oreper et al. | 73/862.621 |
| 6,356,187 B2 | 3/2002 | Jinno et al. | |
| 6,364,352 B1 | 4/2002 | Norton | |
| 6,371,516 B1 | 4/2002 | Miyagawa | 280/735 |
| 6,382,667 B1 | 5/2002 | Aoki | |
| 6,438,476 B1 | 8/2002 | Gray et al. | 701/45 |
| 6,459,973 B1 * | 10/2002 | Breed et al. | 701/45 |
| 6,463,372 B1 * | 10/2002 | Yokota et al. | 701/45 |
| 6,480,616 B1 | 11/2002 | Hata et al. | |
| 6,490,936 B1 * | 12/2002 | Fortune et al. | 73/862.581 |
| 6,502,860 B1 | 1/2003 | Siegfried et al. | |
| 6,517,106 B1 | 2/2003 | Stanley et al. | |
| 6,529,381 B1 | 3/2003 | Schoenfish | |
| 6,554,318 B2 | 4/2003 | Kohut et al. | 280/801.1 |
| 6,578,871 B2 | 6/2003 | Gray et al. | 280/735 |
| 6,587,770 B1 | 7/2003 | Gray et al. | 701/45 |
| 6,595,545 B2 | 7/2003 | Curtis et al. | |
| 6,605,877 B1 | 8/2003 | Patterson et al. | 307/10.1 |
| 6,644,689 B2 | 11/2003 | Murphy | 280/735 |
| 6,650,978 B1 | 11/2003 | Patterson et al. | 701/35 |
| 6,662,094 B2 | 12/2003 | Murphy et al. | 701/45 |
| 6,683,534 B2 | 1/2004 | Patterson et al. | 340/436 |
| 6,749,038 B2 | 6/2004 | Sullivan et al. | 180/268 |
| 6,796,192 B2 | 9/2004 | Sullivan et al. | 73/862.391 |
| 6,812,844 B1 | 11/2004 | Burgess | 340/573.1 |
| 6,818,842 B2 | 11/2004 | Gray et al. | 177/144 |
| 6,847,302 B2 | 1/2005 | Flanagan et al. | 340/666 |
| 6,850,825 B2 | 2/2005 | Murphy et al. | 701/45 |
| 6,851,503 B2 | 2/2005 | Almaraz et al. | 180/268 |
| 6,854,415 B2 | 2/2005 | Barnes et al. | 116/67 R |
| 6,863,286 B2 | 3/2005 | Eros et al. | |
| 6,868,745 B2 | 3/2005 | Sullivan et al. | |
| 6,889,146 B2 | 5/2005 | Sullivan et al. | |
| 6,958,451 B2 | 10/2005 | Breed et al. | |
| 7,004,541 B2 | 2/2006 | Sedlack | |
| 7,021,709 B2 | 4/2006 | Dolan et al. | |
| 7,029,068 B2 | 4/2006 | Yoshida et al. | |
| 7,134,687 B2 | 11/2006 | Breed et al. | |
| 2004/0113634 A1 | 6/2004 | Stanley et al. | |
| 2004/0113797 A1 | 6/2004 | Osborne | |
| 2005/0026499 A1 | 2/2005 | Choi | |
| 2005/0030188 A1 | 2/2005 | Flanagan et al. | 340/667 |
| 2005/0092539 A1 | 5/2005 | Chitalia et al. | |
| 2005/0121956 A1 | 6/2005 | Dolan | |
| 2005/0189805 A1 | 9/2005 | Burley et al. | |
| 2005/0194779 A1 | 9/2005 | Ito et al. | |
| 2005/0275276 A1 | 12/2005 | Patterson | |

OTHER PUBLICATIONS

Written Opinion of the International Searching Authority dated Feb. 5, 2007 for PCT/US2005/20047.

International Search Report dated Feb. 5, 2007 for PCT/US2005/20047.

* cited by examiner

CHILD RESTRAINT SYSTEM COMPRISING WEIGHT SENSOR

CROSS REFERENCE TO RELATED APPLICATION

This application claims the benefits of U.S. Provisional Application No. 60/577,546, filed Jun. 7, 2004, and U.S. Provisional Application No. 60/607,988, filed Sept. 8, 2004, which are incorporated herein by reference.

This application is also related to the following U.S. Patent Applications filed contemporaneously herewith: CHILD SEAT AND MONITORING SYSTEM, U.S. patent application Ser. No. 11/146,927; CHILD SEAT AND MONITORING SYSTEM, U.S. patent application Ser. No. 11/146,928; CHILD SEAT MONITORING SYSTEM AND METHOD FOR DETERMINING A TYPE OF CHILD SEAT, U.S. patent application Ser. No. 11/146,939; CHILD RESTRAINT SYSTEM AND METHOD FOR MONITORING INSTALLATION OF THE CHILD RESTRAINT SYSTEM, U.S. patent application Ser. No. 11/146,926; RESTRAINT SYSTEM AND METHOD FOR MONITORING INSTALLATION OF THE CHILD RESTRAINT SYSTEM, U.S. patent application Ser. No. 11/147,148; CHILD RESTRAINT SYSTEM COMPRISING CONTROL UNIT FOR EVALUATING HARNESS ADJUSTMENT, U.S. patent application Ser. No. 11/147,149. The contents of which are each incorporated herein by reference thereto.

TECHNICAL FIELD OF INVENTION

This invention relates to a child restraint system for safely transporting a child within an automotive vehicle. More particularly, this invention relates to such child restraint system that includes a weight sensor for determining the weight of a child riding therein. In one aspect, child restraint system provides an alert if the weight of the child is not within the recommended size range for the child restraint system, or if the child restraint system is not properly adjusted for the size of the child.

BACKGROUND OF INVENTION

A child restraint system, also referred to as a child car seat, is used for safely transporting a child within an automotive vehicle, so as to minimize the risk of injury to the child in the event of an accident. The design of the child restraint system is based upon the size of the child. A typical rear-facing infant seat is designed for an infant up to about 11 kilograms (about 25 pounds) and comprises a removable carrier in which the infant is placed and which couples to a base that is securely installed in the vehicle. As the child grows, a forward-facing seat is recommended and is typically designed for a child between about 9 kilograms (about 20 pounds) and about 20 kilograms (about 45 pounds). A typical car seat for older children is a belt-positioning booster seat and may be designed for a child between about 18 kilograms (about 40 pounds) and about 45 kilograms (about 100 pounds). Even for a child within the recommended weight range for the particular design, adjustments may be necessary to features of the seat or to the installation of the seat into the vehicle based upon the weight of the child in order to optimize the safety of the child. One problem is that, as the child grows, the parent may not be aware that the child now exceeds the recommended range for the seat, or that the features or installation needs adjustment to accommodate the larger child.

Therefore, a need exists for a child restraint system that includes a sensor for determining the weight of a child occupant. The information about the child weight may then be correlated with information about the design and installation to alert the parent that child is not within the recommended weight range for the design, or that adjustments are recommended to the features or the installation of the child restraint system.

SUMMARY OF THE INVENTION

In accordance with this invention, a child restraint system is adapted to be installed in an automotive vehicle for transporting a child occupant having a weight and for providing an alert signal when the child's weight is not within a recommended weight range for the child restraint system, for example, when the weight is greater than a maximum weight limit for the child restraint system. The child restraint system includes a shell defining a compartment sized and shaped for receiving the child occupant and a cushion disposed within the compartment. The cushion includes a weight sensor providing an electrical signal indicative of the weight of the child occupant. The child restraint system further comprises a control unit operably coupled to the weight sensor to receive the electrical signal. The control unit processes the electrical signal to compare the weight of the child occupant to the recommended range and provides an alert signal when the weight of the child occupant is different from the recommended weight range. The alert signal may activate an audio alert, such as a buzzer or chime, or a visual display, such as a light or written display, to notify the adult operator, typically a parent, that the child is not within the recommended weight range for the child restraint system. In another aspect of this invention, the child restraint system may include a second sensor for sensing a condition, the value of which depends upon the child's weight, and alert the adult operator when adjustment is recommended. By way of examples, the control module may recommend adjustments to the directional orientation or angular orientation of the child restraint system, or to the location or tension of a vehicle seat belt or tether that secures the child restraint system within the vehicle, or to the location or tension of a harness for restraining the child occupant within the child restraint system.

In one aspect of this invention, a method is provided for transporting a child occupant in a child restraint system, which comprises a control unit and is characterized by a recommended weight range. The method includes providing an electrical signal indicative of the weight of the child occupant to the control unit from a weight sensor positioned within the child restraint system. The control unit processes the electrical signal to compare the weight of the child occupant to the recommended weight range. An alert signal is provided when the weight of the child occupant is not within the recommended weight range, for example, because the child's weight exceeds the maximum weight limit for the range. Also, the child restraint system may include a second sensor for sensing a condition of the child restraint system that depends upon the child's weight, and alert the adult operator when adjustment is recommended, such as to the directional orientation or angular orientation of the child restraint system, or to the location or tension of a vehicle seat belt or tether that secures the child restraint system within the vehicle, or to the location or tension of a harness for restraining the child occupant within the child restraint system.

BRIEF DESCRIPTION OF DRAWINGS

This invention will be further described with reference to the accompanying drawings in which.

DETAILED DESCRIPTION OF INVENTION

Figure 1:
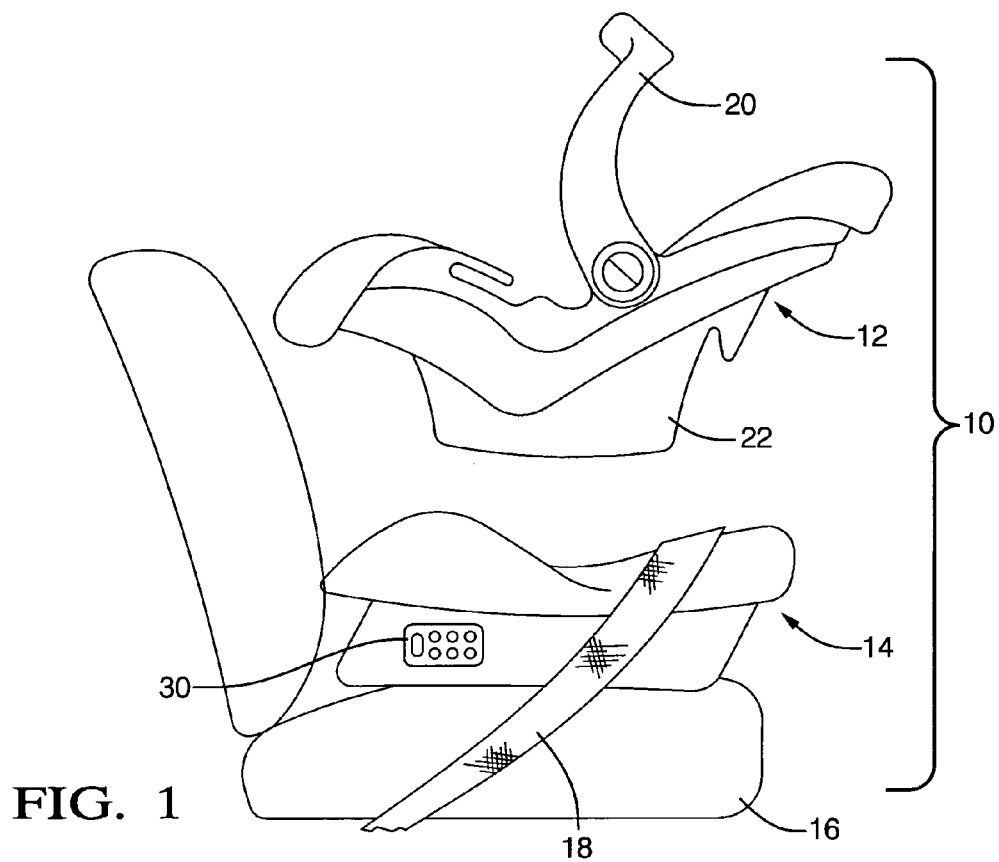
FIG. 1 is a elevational view showing a child restraint system in accordance with this invention.
Figure 2:
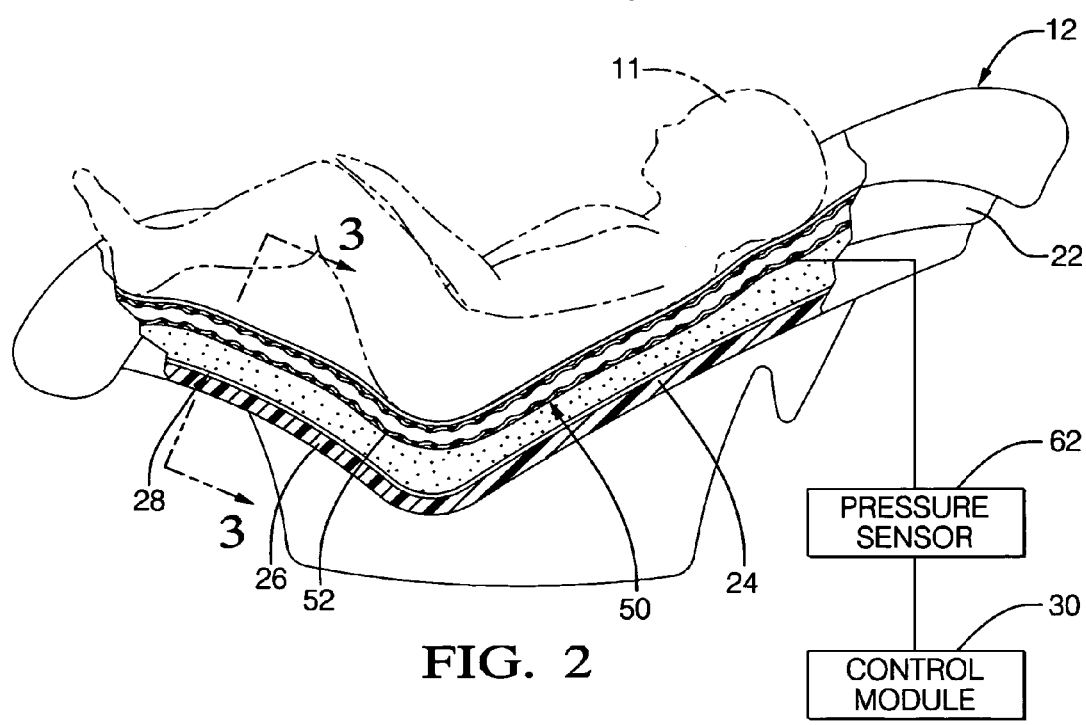
FIG. 2 is a cross-section view of the carrier in FIG. 1.

In a preferred embodiment, referring to FIGS. 1 and 2, a child restraint system comprises a rear-facing infant seat 10 adapted to be installed in an automotive vehicle for safely transporting a child occupant 11 during travel of the vehicle. Seat 10 includes a carrier 12 and a base 14. Base 14 is installed in a rear seat 16 of the vehicle and secured by a vehicle seat belt 18. Alternately, the seat may include one or more tethers (not shown) that attach to anchors in the vehicle structure. The base is intended to remain in the vehicle for an extended period, typically until the child has outgrown the recommended range for seat 10. The child is positioned with carrier 12 for transport both inside and outside the vehicle. Accordingly, carrier 12 securely couples to base 14 for transporting a child within the vehicle, but may be disengaged from base 14 for carrying the child outside the vehicle. A handle 20 is provided to facilitate transport outside the vehicle. A suitable infant seat comprising a carrier and a base is commercially available from Graco Children's Products, Inc., under the trade designation Snugride. It will be understood that child restraint systems are intended to provide safe in-vehicle transport of a child having a size within a recommended range. The recommended range depends upon the particular design of the child restraint system. By way of an example, rear-facing infant seat 10 may be designed for a child having a weight up to about 9 kilograms (about 20 pounds).

Carrier 12 comprises a shell 22 formed of a rigid polymeric material and defining a compartment sized and shaped for accommodating the child having a weight within the recommended range for seat 10. The shell includes a back portion 24 that supports the back of child 11 and a seat portion 26 that supports the buttocks and legs of the child. The compartment is lined with a cushion 28 to enhance comfort of the child within the carrier. Carrier 12 also includes a harness (not shown) for restraining the child within the carrier. A suitable harness includes a belt that extends through slots in the shell and cushion and a buckle for securing the belt about the child.

In this embodiment, seat 10 is equipped with a control module 30 that monitors conditions pertaining to the installation or features of the seat, including the weight of child 11. In this embodiment, control module 30 is mounted in base 14 and connected to sensors in carrier 12 and base 14. A suitable connection may be made through wire harnesses, using a plug and socket to connect the harness in the carrier to the harness in the base, thereby allowing the carrier to be detached from the base for transport outside the vehicle. Alternately, sensors in the carrier may be coupled to one or more transmitters that transmit radio frequency signals, and control unit 30 may include a receiver for receiving the signals, to allow wireless communication therebetween. In an alternate embodiment, the control module may be mounted in the carrier and, if desired, coupled to sensors in the base.

Figure 3:
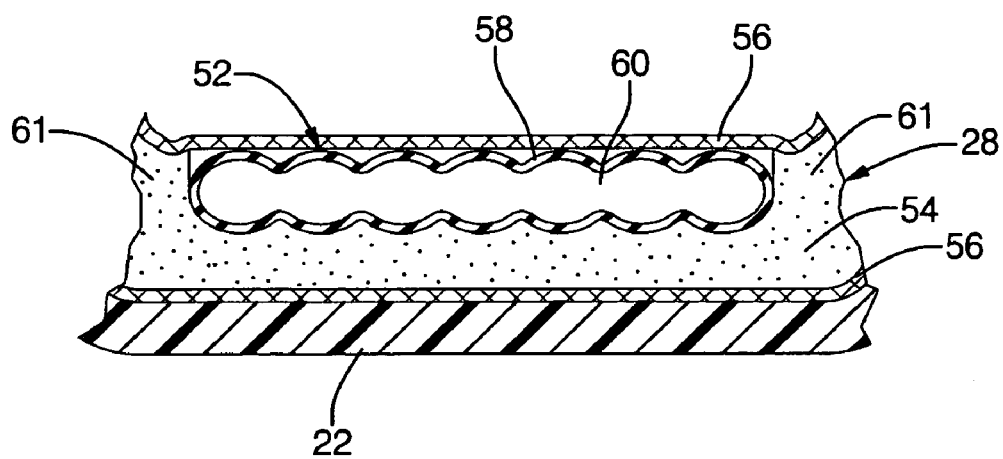
FIG. 3 is a cross-sectional view of the carrier in FIG. 2, taken along line 3-3.

In accordance with this invention, seat 10 is provided with a weight sensor 50. A preferred weight sensor comprises a bladder 52 incorporated within cushion 28. Referring to FIGS. 2 and 3, cushion 28 comprises a mat 54 formed of a polymeric foam material and a cloth covering 56 that enhances child comfort and provides an aesthetically pleasing appearance. Bladder 52 is received in a pocket formed in the outer surface of mat 54 and underlying covering 56. Alternately, the bladder may be located between the shell and the cushion, or within a pocket of the cushion adjacent the surface of the shell. An outer location is preferred to provide reliable contact with the child despite irregularities in the shell and thereby increase accuracy of the weight measurement. Bladder 52 preferably overlies both back portion 24 and seat portion 26 of shell 22. In this manner, bladder 52 bears substantially all of the weight of the child, thereby providing a more accurate measurement of the child's weight.

Bladder 52 preferably comprises flexible membrane 58 that defines a fixed volume compartment that contains a fluid 60. A preferred bladder is available from Delphi Automotive Systems, LLC, and is of a type used in other automotive seat weight applications, but is sized and shaped for the carrier. The weight of the child in contact with the bladder increases the fluid pressure. A pressure sensor 62 is fluidly coupled to the fluid within the membrane and provides an electrical signal indicative of the fluid pressure within the membrane. A preferred electrical signal is a voltage output proportional to the weight exerted on the bladder. Thus, in the absence of a child, the output signal is a first, relatively low value representative of the absence of weight exerted on the bladder, whereas the output signal has a second, higher value in response to weight exerted on the bladder by a child placed within the seat.

Figure 4:
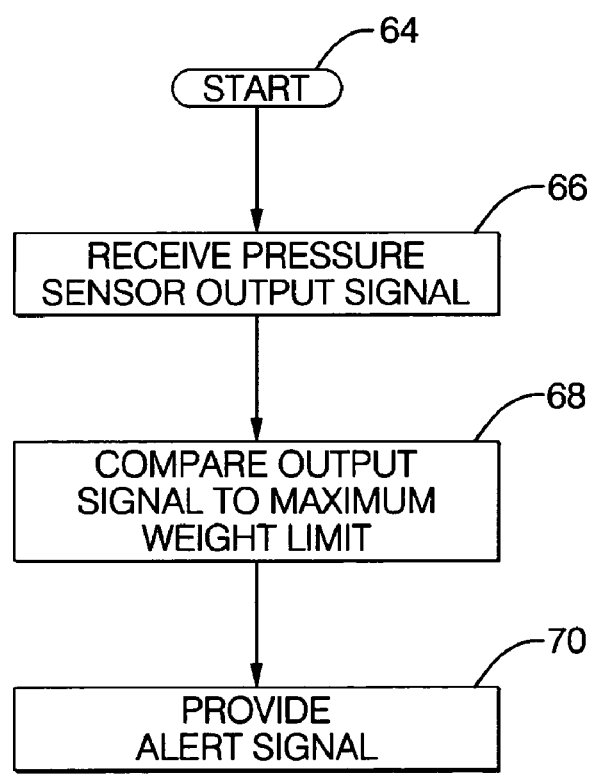
FIG. 4 is a flow diagram showing a method for providing an alert signal in accordance with this invention.
Figure 5:
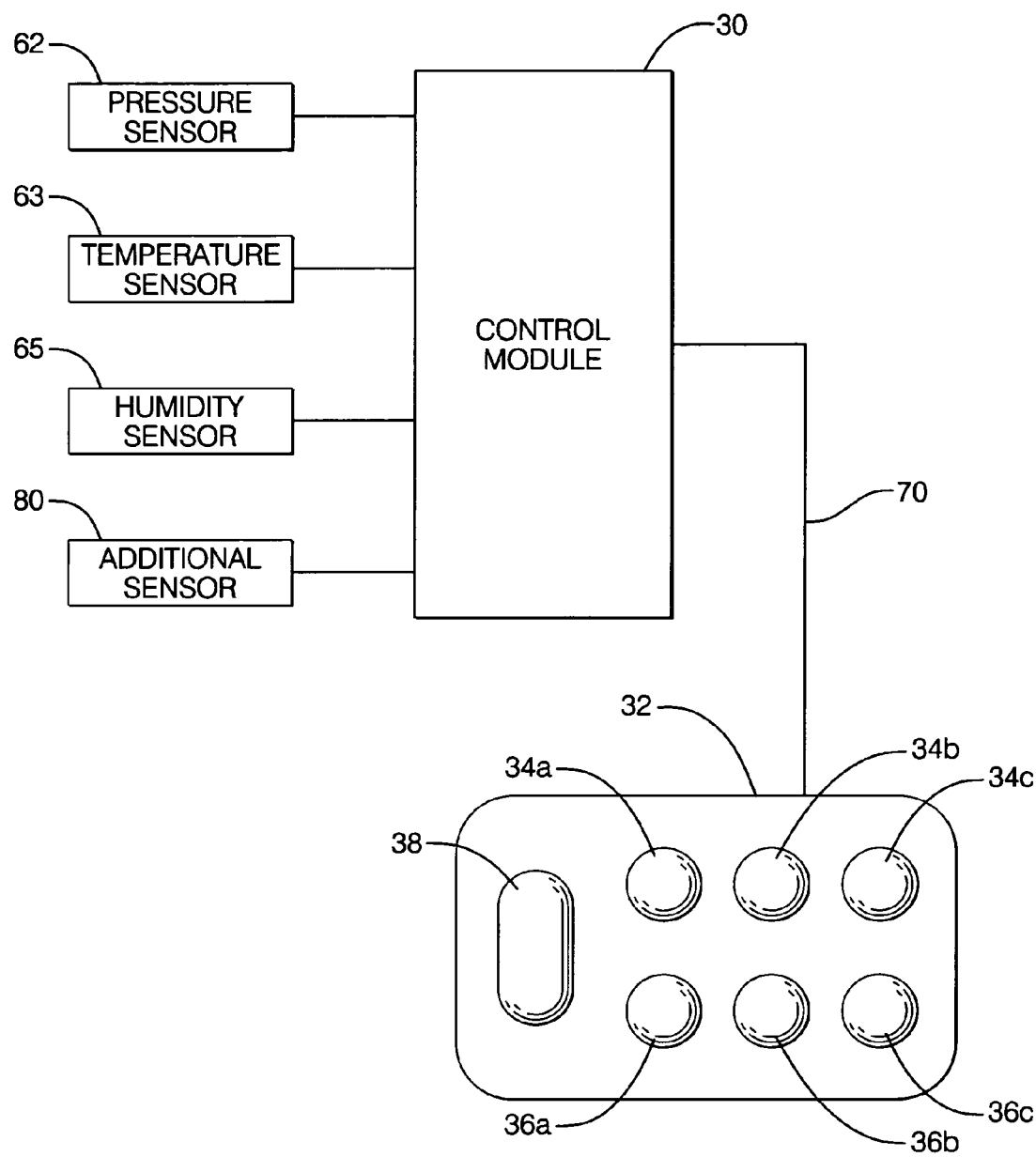
FIG. 5 is a schematic diagram showing electrical couplings to a control module in accordance with an embodiment of this invention.

The pressure sensor is electrically coupled to control module 30, which in turn comprises a display 32, as shown in FIG. 5. The control module receives the output signal from the pressure sensor and includes a microprocessor for processing the signal to determine a weight of the child. Referring to FIG. 4, there is schematically shown a flow chart for determining the size of a child occupant. At step 64, when a child is placed into carrier 12 and carrier 12 is assembled into base 14, the control module initiates an evaluation of the child size. This may be in response to a parent pressing an activation button 38 in display 32. Alternately, the start step may be initiated in response to a signal from an interlock switch activated when the carrier is assembled to the base.

At step 66, the control unit receives an output signal from the pressure sensor 62. At step 68, the control unit compares the output signal to a value indicative of the predetermined weight limit for seat 10. In a preferred embodiment, the output signal of the pressure sensor is a voltage proportional to the weight of the child and is compared to the voltage value corresponding to a signal that would be produced for a child positioned in the seat and having a weight equal to the maximum weight limit for which the seat is intended. The voltage value for the maximum weight limit may be obtained either by a look-up table or by an algorithm. It will be appreciated that the viscosity of fluid 60 and the elasticity of membrane 58 may depend upon environmental factors, including ambient temperature and humidity. In one aspect of this embodiment, the control module is coupled to a temperature sensor 63 or a humidity sensor 65, as shown in FIG. 5. Temperature sensor 63 and humidity sensor 65 may be suitably located in the carrier adjacent the child or in the base proximate to the control module, and provide electrical signals indicative of temperature and humidity. Control module 30 adjusts the value of the pressure signal from sensor 62 to compensate for temperature or humidity factors, using an algorithm or look-up table, thereby providing a value more accurately corresponding to the child's weight. Alternately, the control module may adjust the voltage value for the maximum weight limit to compensate for ambient temperature or humidity.

In this embodiment, control module 30 is electrically coupled to a display 32 that comprises a series of lights 34$a$, 34$b$, 34$c$, such as green lights, that confirm proper adjustment of seat 10, and a series of lights 36$a$, 36$b$, 36$c$, such as red lights, that provide a warning of improper adjustment of the seat. By way of an example, display 32 includes a green light 34$a$ that confirms that the child weight is within a predetermined limit for seat 10, and a red light 36$a$ that alerts the parent or other adult operator that the child weight is greater than the predetermined limit for the seat. Thus, at step 70 in FIG. 4, control unit 30 outputs an electrical signal to illuminate the green light, or alert the adult operator by illuminating the red light. While in this embodiment the alert signal activates a light, the alert signal may activate an audible alert, such as a chime or buzzer, optionally in combination with the signal light. Alternately, the readable display, such as a liquid crystal display, may be used to provide a descriptive alert.

Thus, this invention provides a child restraint system that includes a system for sensing the weight of the child occupant and for determining whether the child's weight exceeds the range recommended for the design of the seat. For this purpose, the restraint system is equipped with a control module that is coupled to a weight sensor in the cushion. One advantage of the preferred bladder sensor is that it is similar to sensors developed for other automotive applications and so reliable and durable under conditions typically encountered during automotive operation. The control module provides an alert signal, in a visual or audible form, that may be readily understood by a parent or other operator.

In the described embodiment, the child restraint system having a weight sensor in accordance with this invention is a rear-facing infant seat, and is used to determine whether the child's weight exceeds a recommended maximum limit. Rear-facing infant seats are commonly designed to transport newborn infants and so does not need to evaluate for a minimum weight limit. This invention is also suitable for use in a forward facing seat or a booster seat. In addition to a maximum weight, forward-facing seats and booster seats are commonly designed for a child having a recommended minimum weight. Thus, in an alternate embodiment wherein the child restraint system is designed for a child having a weight within a recommended range between a recommended minimum weight limit and a recommended maximum weight limit, the control module compares the output signal of the weight sensor to values corresponding to the recommended minimum weight and the recommended maximum weight limit, and provides an alert signal if the child weight is not within the recommended weight range.

In the described embodiment, seat 10 is an infant seat, and vehicle seat belt 18 secures base 14. In an alternate embodiment, such as a booster seat, the vehicle seat belt may be used to restrain the child within the seat. Tension in the vehicle seat may increase the fluid pressure within the bladder. An additional sensor may be provided to sense the tension in the vehicle seat belt and provide a tension signal to the control module. The control module may then process the output signal from pressure sensor 62 to compensate for the additional load applied by the vehicle seat belt. Also, referring to FIG. 3, it is an advantage that mat 54 includes sidewalls 61 disposed outboard of bladder 52 and having a height corresponding to the height of the bladder. Contact between the cushion and the belt occurs at the sidewalls, apart from the bladder, and forces exerted as a result thereof are not exerted directly on the bladder. As a result, the fluid pressure within the bladder, and thus the output signal of the pressure sensor, more accurately indicates the weight of the child. Alternately, sidewalls 61 may be incorporated into the belt guide paths in shell 22.

Depending upon the type and design of child restraint system and the manufacturer's recommendations relating to installation and use, this invention may also be employed to evaluate other conditions, the proper adjustment of which is dependent upon the weight of the child occupant. For this purpose, the child restraint system is equipped with one or more additional sensors 80 that monitor a condition of the seat and provide an electrical signal indicative of the condition to the control module. By way of examples, the following conditions may be monitored by a sensor and may require adjustment based upon the weight of a child occupant:

Directional Orientation Proper orientation of the child seat relative to the front of the vehicle may depend upon the weight of the child occupant. For example, the seat may be installed so that the child faces the rear of the vehicle if the child's weight less than or equal to 20 kilograms, and faces the front of the vehicle if the child's weight is greater than 20 kilograms. For this purpose, the seat is equipped with a directional sensor to determine the direction of the seat relative to the front of the vehicle. A suitable direction sensor is a longitudinal accelerometer positioned within the vehicle to determine direction based upon vehicle forward acceleration.

Angular Orientation Proper installation of the child seat may depend upon the orientation of the child seat relative to predetermined axis, preferably a vertical axis, also referred to as a z-axis. For example, the child restraint system may require a first angular orientation for a child occupant having a weight within a first range, and in a second angular orientation for a child occupant having a weight within a second range. For this purpose, the child restraint system comprises a sensor 80 having an output that is indicative of the angle of the seat relative to a vertical or other predetermined axis. A suitable sensor is an accelerometer sensor described in U.S. patent application U.S. patent application Ser. No. 11/147,148, incorporated herein by reference.

Vehicle Belt Tension The desired tension applied by the vehicle seat belt may depend upon the weight of the child occupant. For this purpose, the seat may be equipped with a belt tension sensor to detect the force applied by the vehicle seat belt and provide a signal indicative thereof to the control module. A suitable belt tension sensor is described in U.S. patent application U.S. patent application Ser. No. 11/146,926, incorporated herein by reference.

Tether Tension In a child restraint system equipped with a tether for securing the child seat to an anchor in the vehicle, proper adjust of the tether may depend upon the weight of the child occupant. For this purpose, the child seat may be equipped with a sensor that senses the tension of the tether. A suitable tether and tension sensor is described in U.S. patent application U.S. patent application Ser. No. 11/146,927, incorporated herein by reference.

Harness Adjustment In a child restraint system equipped with a harness for restraining the child within the seat, proper adjustment of the harness may depend upon the weight of the child occupant. For example, the harness may include belts that extend through slots in the shell, and the shell may include slots at alternate locations such that the selection of the particular slots depends upon the size of the child. For this purpose, the shell may include sensors located at slots to determine the presence of a belt. A suitable harness having sensors is described in U.S. patent application U.S. patent application Ser. No. 11/147,149, incorporated herein by reference.

In each instance, sensor 80 is electrically coupled to the control module and provides an electrical signal indicative of the condition being sensed. The control module determines, using a look-up table or suitable algorithm, a desired value for the sensed condition, which desired value is based upon the weight of the child as determined by weight sensor 50. The control module provides an alert signal to indicate whether the sensed condition is properly adjusted. For the display shown in FIG. 5, the alert signal illuminates a green light when sensed property is within a the desired range, and a red light based when the sensed property is not within the desired range.

While this invention has been described in terms of the preferred embodiments thereof, it is not intended to be so limited, but rather only to the extent set forth in the claims that follow.

We claim:

1. A child restraint system adapted to be mounted within an automotive vehicle for transporting a child occupant having a weight less than a maximum weight limit, said child restraint system comprising
   a shell defining a compartment sized and shaped for receiving a child occupant;
   a cushion disposed within the compartment, said cushion comprising a weight sensor providing an electrical signal indicative of the weight of the child occupant, and
   a control unit operably coupled to the weight sensor to receive the electrical signal, said control unit being capable of processing said electrical signal to compare the weight of the child occupant to the maximum weight limit and providing an alert signal when the weight of the child occupant exceeds the maximum weight limit.

2. The child restraint system in accordance with claim 1 wherein the electrical signal is an output voltage, and wherein the control unit compares the output voltage to a threshold voltage value and provides an alert signal when said output voltage exceeds said threshold voltage value.

3. The child restraint system in accordance with claim 1 wherein the child restraint system is adapted for transporting a child occupant having a weight greater than a minimum weight limit, and wherein the control unit is capable of processing said electrical signal to compare the weight of the child occupant to the minimum weight limit and provides an alert signal when said electrical signal is less than the minimum weight limit.

4. The child restraint system in accordance with claim 1 wherein the weight sensor comprises a bladder that includes a deformable membrane and a fluid contained within said membrane and having a pressure dependent upon a weight of the child occupant, and a pressure sensor operable coupled to said fluid for measuring the pressure thereof and providing an electrical output indicative of the measured pressure.

5. The child restraint system in accordance with claim 4 wherein the child restraint system is an infant seat comprising a carrier that includes a back portion for supporting a back of the child occupant and a seat portion for supporting buttocks and legs of the child occupant, and wherein the bladder extends over the back portion and the seat portion.

6. The child restraint system in accordance with claim 1 wherein the alert signal causes a light to be illuminated.

7. The child restraint system in accordance with claim 1 further comprising a second sensor for sensing a condition of relating to installation or adjustment of the child restraint system, said condition having a first value for a child occupant having a weight within a first range and a second value for a child occupant having a weight within a second range, said second sensor being electrically coupled to said control unit and providing an electrical signal indicative of a sensed value, whereby said control unit determines the weight of the child occupant based upon weight sensor, determines a desired value based upon the determined weight of the child occupant, compares the sensed value to the desired value, and provides an alert when said sensed value is not within the range of the desired value.

8. The child restraint system in accordance with claim 7 wherein the condition is directional orientation, angular orientation, vehicle belt tension, tether tension or harness adjustment.

9. A child restraint system adapted to be mounted within an automotive vehicle for transporting a child occupant having a weight within a weight range defined by a maximum weight limit, said child restraint system comprising
   a base adapted to be installed in the automotive vehicle;
   a carrier adapted to be assembled to said base, said carrier comprising a shell defining a compartment sized and shaped for receiving a child occupant and a cushion disposed within the compartment, said cushion comprising a weight sensor comprising a bladder containing a fluid having a pressure indicative of the weight of the child occupant and a pressure sensor operably coupled to said fluid for sensing the pressure thereof and providing an electrical signal indicative of the sensed pressure, and
   a control unit operably coupled to the pressure sensor to receive the electrical signal, said control unit being capable of processing said electrical signal to determine the weight of the child occupant and to compare the weight of the child occupant to the maximum weight limit, said control unit providing an alert signal when the weight of the child occupant exceeds the maximum weight limit.

10. The child restraint system in accordance with claim 9 wherein said control unit is mounted in said base.

11. The child restraint system in accordance with claim 9 wherein the pressure sensor provides an output voltage proportional to the sensed pressure, and wherein the control unit compares the output voltage to a threshold voltage.

12. The child restraint system in accordance with claim 9 further comprising a further sensor that provides an orientation signal indicative of a longitudinal orientation of the child restraint system, and wherein the control unit is coupled to the further sensor to receive the orientation signal and determine a sensed longitudinal orientation, said control unit determining a recommended longitudinal orientation for said child restraint system based upon the weight of the child occupant, comparing the sensed longitudinal orientation and the recommended longitudinal orientation and providing an alert when the sensed longitudinal orientation is different from the recommended longitudinal orientation.

13. The child restraint system in accordance with claim 9 further comprising a further sensor that provides an orientation signal indicative of a angle of the child restraint system relative to a predetermined axis, and wherein the control unit is coupled to the further sensor to receive the orientation signal and determine a sensed angle, said control unit determining a recommended angle for said child restraint system based upon the weight of the child occupant, comparing the sensed angle and the recommended angle and providing an alert when the sensed angle is different from the recommended angle.

14. The child restraint system in accordance with claim 9 further comprising a further sensor that provides an tension signal indicative of a tension exerted by a vehicle belt on said child restraint system, and wherein the control unit is coupled to the further sensor to receive the tension signal and determine a sensed tension, said control unit determining a recommended tension based upon the weight of the child occupant, comparing the sensed tension and the recommended tension and providing an alert when the sensed tension is different from the recommended tension.

15. The child restraint system in accordance with claim 9 further comprising a tether adapted to be attached to a vehicle structure for securing said base and said carrier within said automotive vehicle, and a further sensor that provides an tension signal indicative of a tension in said tether, and wherein the control unit is coupled to the further sensor to receive the tension signal and determine a sensed tension, said control unit determining a recommended tension based upon the weight of the child occupant, comparing the sensed tension and the recommended tension and providing an alert when the sensed tension is different from the recommended tension.

16. The child restraint system in accordance with claim 9 further comprising a harness for restraining the child occupant within the carrier, and a further sensor that provides an tension signal indicative of a tension in said harness, and wherein the control unit is coupled to the further sensor to receive the tension signal and determine a sensed tension, said control unit determining a recommended tension based upon the weight of the child occupant, comparing the sensed tension and the recommended tension and providing an alert when the sensed tension is different from the recommended tension.

17. A method for transporting a child occupant in a child restraint system, said child occupant having a weight, said child restraint system comprising a control unit and being characterized by a maximum weight limit, said method comprising
providing an electrical signal to said control unit from a weight sensor positioned within the child restraint system, said electrical signal being indicative of the weight of the child occupant;
processing said electrical signal to compare the weight of the child occupant to the maximum weight limit; and
providing an alert signal when the weight of the child occupant exceeds the maximum weight limit.

18. A method according to claim 17 wherein the electrical signal is an output voltage, and wherein the processing step comprises comparing the output voltage to a threshold voltage value indicative of the maximum weight limit.

19. A method according to claim 17 wherein the child restraint system is characterized by a minimum weight limit, and wherein said method further comprises processing the electrical signal to compare the weight of the child occupant to the minimum weight limit and providing an alert signal when said weight of the child occupant is less than the minimum weight limit.

20. A method according to claim 17 wherein the weight sensor comprises a bladder containing a fluid having a pressure dependent upon the weight of the child occupant, and wherein the electrical signal is an output from a pressure sensor operable coupled to said fluid.

21. A method according to claim 17 further comprising illuminating a display light based upon said alert signal.

22. A method according claim 17 wherein said child restraint system is further characterized by a condition having a first value for a child occupant having a weight within a first range and a second value for a child occupant having a weight within a second range, said method further comprising providing a second electrical signal by a second sensor to said control unit, said second signal being indicative of sensed value of said condition; determining, by said control unit, a desired value of said condition based upon the weight of the child occupant, comparing the sensed value to a desired value; and providing an alert when said sensed value does not correspond to the desired value.

23. A method according claim 22 wherein the condition is directional orientation, angular orientation, vehicle belt tension, tether tension or harness adjustment.

24. A child restraint system adapted to be mounted within an automotive vehicle, the child restraint system comprising:
a carrier configured for transporting the child occupant, the carrier including a shell, a cushion, and a weight sensor, the shell defining a compartment sized and shaped for receiving the child occupant, the cushion being disposed within the compartment, the weight sensor being incorporated within the carrier and providing an electrical signal indicative of a weight of the child occupant; and
a control unit operably coupled to the weight sensor to receive the electrical signal, the control unit being capable of processing the electrical signal to compare the weight of the child occupant to a maximum weight limit and providing an alert signal when the weight of the child occupant exceeds the maximum weight limit.

* * * * *